United States Patent [19]

Crawford

[11] Patent Number: 4,789,283

[45] Date of Patent: Dec. 6, 1988

[54] FLUID-TIGHT BLIND RIVET

[75] Inventor: Fred Crawford, El Segundo, Calif.

[73] Assignee: Pavco Industries, Inc., Huntington Beach, Calif.

[21] Appl. No.: 906,611

[22] Filed: Sep. 10, 1986

Related U.S. Application Data

[63] Continuation-in-part of Ser. No. 751,274, Jul. 2, 1985, abandoned.

[51] Int. Cl.⁴ .............................................. F16B 13/04
[52] U.S. Cl. ........................................ 411/43; 411/34; 411/69; 411/902
[58] Field of Search .................. 411/34, 35, 36, 37, 411/38, 43, 69, 70, 501, 504, 506, 900, 901, 902, 55

[56] References Cited

U.S. PATENT DOCUMENTS

| | | | |
|---|---|---|---|
| 309,430 | 12/1884 | Wood | 411/501 |
| 2,410,398 | 10/1946 | Williams, Jr. et al. | 411/501 |
| 2,991,858 | 7/1961 | Taylor et al. | 411/504 |
| 3,292,482 | 12/1966 | Fry et al. | 411/43 |
| 3,494,243 | 2/1970 | Kleinhenn | 411/900 |
| 3,642,312 | 2/1972 | Dalton | 411/504 |
| 4,012,984 | 3/1977 | Matuschek | 411/34 |
| 4,376,604 | 3/1983 | Pratt et al. | 411/34 |
| 4,405,256 | 9/1983 | King, Jr. | 411/69 |
| 4,451,189 | 5/1984 | Pratt | 411/34 |
| 4,473,914 | 10/1984 | Haft | 411/43 |
| 4,560,312 | 12/1985 | Grady | 411/55 |

FOREIGN PATENT DOCUMENTS

| | | | |
|---|---|---|---|
| 1286812 | 1/1969 | Fed. Rep. of Germany | 411/43 |
| 497379 | 9/1954 | Italy | 411/34 |
| 646298 | 11/1950 | United Kingdom | 411/34 |
| 767547 | 2/1957 | United Kingdom | 411/504 |

Primary Examiner—Neill R. Wilson
Attorney, Agent, or Firm—Natan Epstein; William H. Pavitt, Jr.

[57] ABSTRACT

A fluid tight metallic blind rivet, for aerospace applications, is disclosed comprising a tubular rivet body that is obtained by providing an outer ductile sleeve or jacket on an approved aerospace rivet body wherein the rivet is set by collapsing the body by means of a pull-stem that is locked relative to the body when the rivet is set.

6 Claims, 2 Drawing Sheets

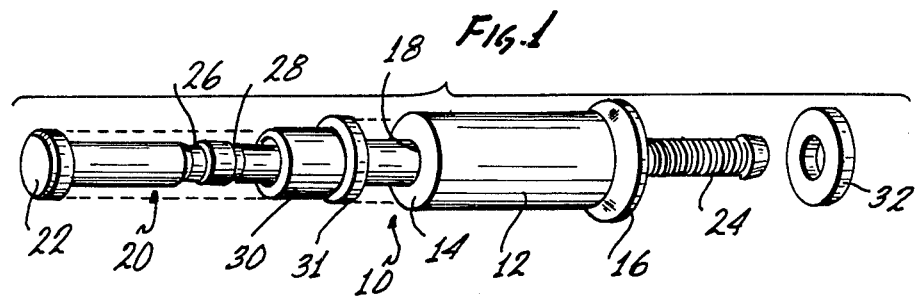
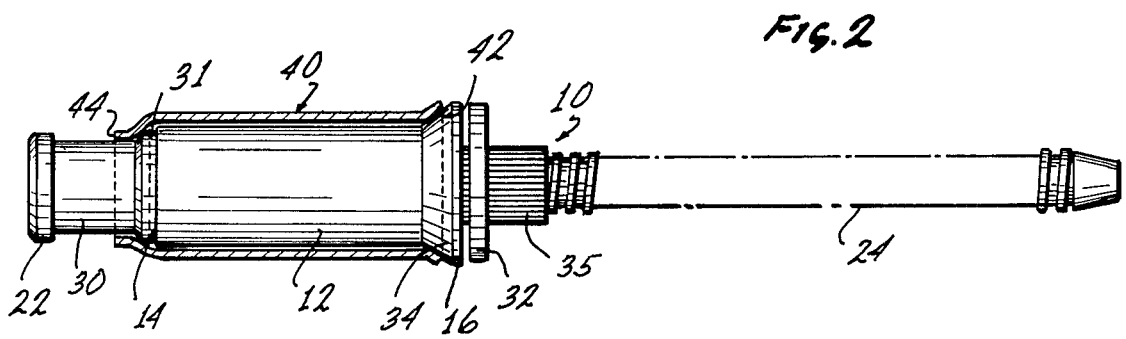
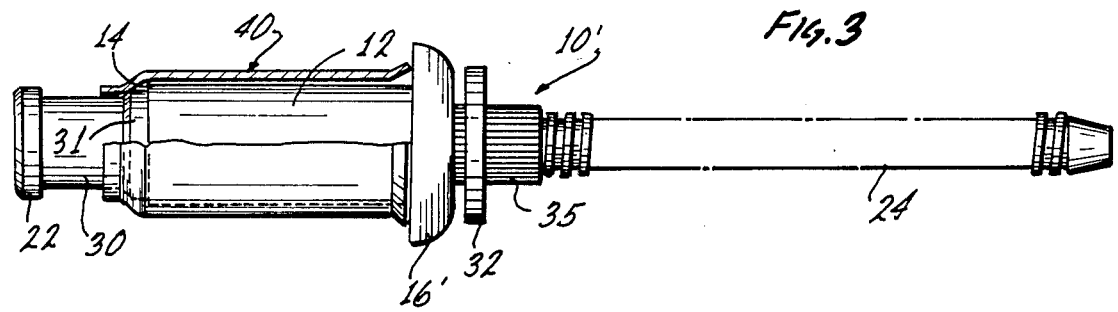
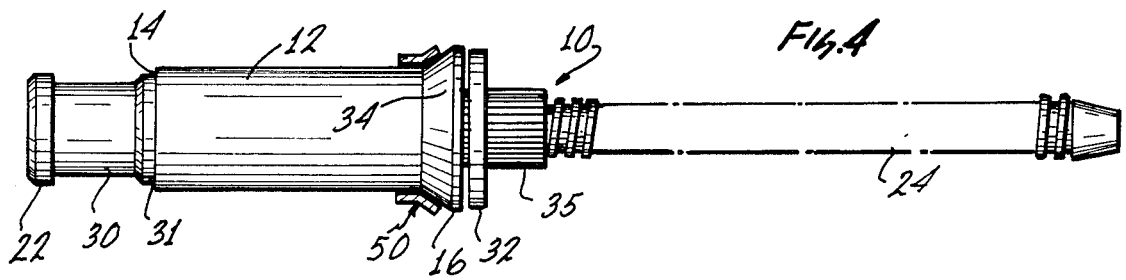
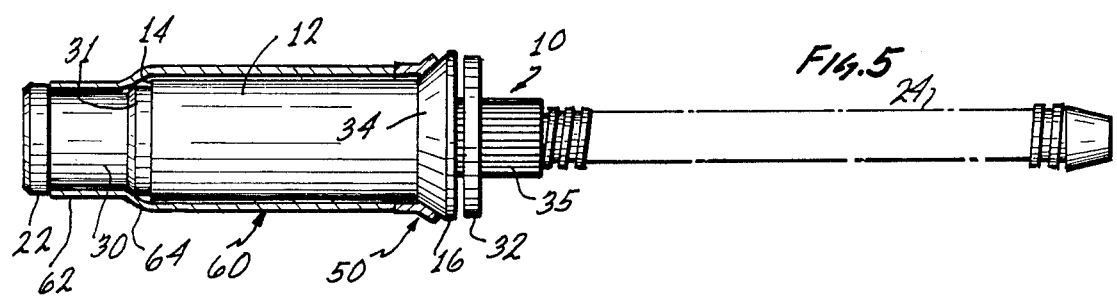

FLUID-TIGHT BLIND RIVET

BACKGROUND OF THE INVENTION

1. Field of the Invention

The present invention pertains generally to the field of rivet fasteners and is more particularly directed to blind rivets for making fluid-tight rivet joints.

2. State of the Prior Art

Ordinary rivets generally consist of a solid cylindrical shank terminating at one end in a rivet head. Two or more structural members, such as sheets of metal, may be fastened together by inserting the rivet shank through aligned holes in the overlapping sheets, and driving the end of the rivet shank with a suitable riveting tool so as to enlarge its diameter. The sheets are thus held tightly together between the rivet head on one side and the enlarged driven end of the rivet on the opposite side. Such rivet fasteners have been long known and due to the high strength and long term reliability of rivet joints they have been used successfully in a wide variety of applications, particularly in the assembly of aircraft frames.

Ordinary rivets, however, cannot be relied upon to make a fluid-tight joint. In certain applications, for example, in wet aircraft wings where the hollow wing also serves as a fuel tank, it was soon discovered that fuel would leak through the rivet joints due to an imperfect seal between the rivet shank and the sheet metal. The rim of the hole into which the rivet shank is inserted often is not perfectly circular and may also have serrations caused by the drilling process. The rivet shank is normally made of relatively hard material and although it may expand somewhat within the hole during the rivet setting process, it does not flow sufficiently to fill small irregularities. As a result, small openings remain in the rivet joints, which when multiplied by the many hundreds of rivets typically used in assembling an air frame, would allow for considerable total leakage. Even very small leaks of fuel or fuel fumes in an aircraft create an unacceptable risk of fire and explosion and must be avoided.

This problem was overcome in U.S. Pat. No. 2,410,398 to Williams Jr. et al by providing a thin, outer jacket of soft aluminum over the shank of an otherwise conventional rivet. Various such outer jacket configurations are known, some extending the full length of the rivet shank, others consisting of an under-head washer covering only the conical inner surface of a flathead or countersink rivet head, and still others having both a shank jacket and an under-head washer. These fluid-tight rivets were developed in response to the demand of the aircraft industry for a dependable leak-proof rivet for use in aircraft wet wing structural assemblies for transport and cargo aircraft during the second World War, and are still in widespread use in the manufacture, maintenance, and repair of commercial and military aircraft. These rivets are self-sealing when installed and driven by normal riveting methods and tools. The self-seal occurs due to the flow characteristics of the softer metal outer jacket and/or under-head washer, without the addition of liquid sealants, caulks or compounds. When the rivet shank expands within the rivet hole, the softer jacket flows under the pressure of the expanding rivet shank so as to fill any minute voids between the hole rim and the shank, thus forming the fluid-tight seal.

Another sometimes problematic characteristic of conventional rivets is that their installation requires access to both sides of the workpiece. This is because the rivet is inserted into the hole on one side of the workpiece, i.e. the side on which the rivet head remains, and the rivet is then driven from the opposite side so as to flatten or expand the other end and thus make the rivet joint. In certain situations arising in the assembly of aircraft structures, easy access to both sides of the workpiece is not possible. In order to meet the need thus created, so-called blind rivets have been devised which allow the rivet joint to be made by working from only one side of the workpiece. Such rivets, of which there are various designs, have been in commercial use for a considerable length of time.

Blind rivets typically comprise a rivet body or shank having a head at one end and an opposite inner end. A pull-stem extends through an axial inner bore in the rivet body and terminates in a stem head on the blind side of the rivet unit. A collapsible barrel is mounted coaxially on the pull-stem between the stem head and the inner end of the rivet body. The outer end of the pull-stem extends from the head end of the rivet shank and can be grasped by a riveting tool which bears against the rivet head while simultaneously pulling on the pull-stem. As the stem is pulled, the stem head drives the collapsible barrel against the inner end of the rivet body. The barrel is forced into the inner end causing the tubular rivet body to expand at its inner end. The barrel's penetration is halted at a point where the structure surrounding the rivet body, i.e. the rim of the rivet hole prevents the rivet shank from sufficiently expanding to allow further penetration by the collapsible barrel. At this stage, as further pulling force is applied to the pull-stem, the barrel collapses under compressive force between the stem head and the rivet body. The stem is pulled until the barrel is fully collapsed and a large bulb is formed as a result of the combined expansion of the rivet shank and collapse of the barrel on the blind side of the structure being fastened. The pull-stem can then be brokenoff flush with the rivet head to thus complete installation of the rivet. This type of rivet possesses expansion characteristics superior to those of other blind rivets.

A more detailed description of such a blind rivet fastener, including specification of dimensions and material characteristics suitable for its manufacture are found in U.S. Pat. No. 4,451,189 issued to Pratt.

A blind rivet which still further improves over the Pratt rivet has recently become available and is characterized by a radial locking groove on the pull-stem within the inner bore of the rivet body. As the rivet body expands during installation it also extrudes inwardly into the locking groove to form a radial flange which mechanically interlocks to prevent subsequent withdrawal of the pull-stem from the rivet body. Provision of this locking groove eliminates the need for a separate locking ring and a flared seat therefor in the rivet head which are found in the Pratt rivet.

A real need has existed for a blind rivet which is also capable of making a fluid-tight joint in applications similar to those in which fluid-tight conventional rivets have been used. In spite of continuing progress in the development of blind rivets the long felt need for a fluidtight blind rivet, particularly in modern jet aircraft construction, remains unsatisfied and all efforts directed towards such development have until now ended in failure. Even though fluid-tight ordinary rivets have been known, accepted and used in the aircraft industry for several decades, no effective fluid-tight blind rivet is known in the industry.

SUMMARY OF THE INVENTION

Since at least 1978, this applicant has made many attempts to provide blind rivets with a soft metal outer jacket, as was done with ordinary rivets in the past, in order to produce a fluid-tight blind rivet. Repeatedly, it was found that the limited expansion of the rivet shank within the rivet hole was inadequate to press the soft outer jacket against the hole rim and cause the jacket material to flow and conform to such irregularities of the hole rim as may be present. Another recurrent source of difficulty was fluid leakage through the internal bore of the blind rivet.

After many unsuccessful attempts, this applicant has discovered that a sleeve of relatively soft, ductile material, such as aluminum, when installed on the aforementioned recently developed blind rivet, does in fact form an effective fluid-tight seal between the rivet shank and the hole rim. It was found that this particular blind rivet, which is more fully described below and illustrated in the attached drawings, does expands sufficiently within the rivet hole such that in combination with a softer outer jacket a fluid-tight seal is consistently achieved about the periphery of the rivet body. This Applicant has further discovered that this particular blind rivet positively seals its inner bore against fluid leakage when installed and thus also overcomes the inner bore leakage problem which frustrated prior efforts towards development of a fluid-tight blind rivet.

According to the present invention, a relatively thin outer layer of a ductile material softer than the rivet body material is provided over the rivet body interposed between the rivet body and the workpiece being fastened so as to extrude under pressure of the expanding rivet when the rivet fastener is set within a rivet hole in a workpiece, thereby to form the desired fluid-tight joint.

The outer or layer may be a separately formed sleeve element or a layer of material directly applied and bonded to the rivet fastener. The sleeve or the layer can take the form of a separate tubular element extending from the rivet head and covering the full length of the rivet body as well as partially covering the collapsible barrel; or in an alternate embodiment the tubular element may extend over the full length of both the rivet body and the collapsible barrel. In a still further embodiment of the invention, the softer outer layer may take the form of an under-head washer fitted over the inner, frustoconical head surface of a flathead, countersink type rivet.

BRIEF DESCRIPTION OF THE DRAWINGS

FIG. 1 is an axially exploded view of the blind rivet used to make applicant's fluid-tight fastener.

FIG. 2 is a cross sectional view of a flathead fluid-tight rivet provided with a soft metal outer sleeve on the rivet body according to the present invention.

FIG. 3 is a fluid-tight blind rivet as in FIG. 2 but having a universal round head.

FIG. 4 is a flathead blind rivet provided with a soft metal under-head washer according to the present invention.

FIG. 5 is a flathead blind rivet provided with a full length outer jacket extending from the rivet head to the pull-stem head and also including an under-head washer.

DETAILED DESCRIPTION OF THE PREFERRED EMBODIMENTS

Figure 6:
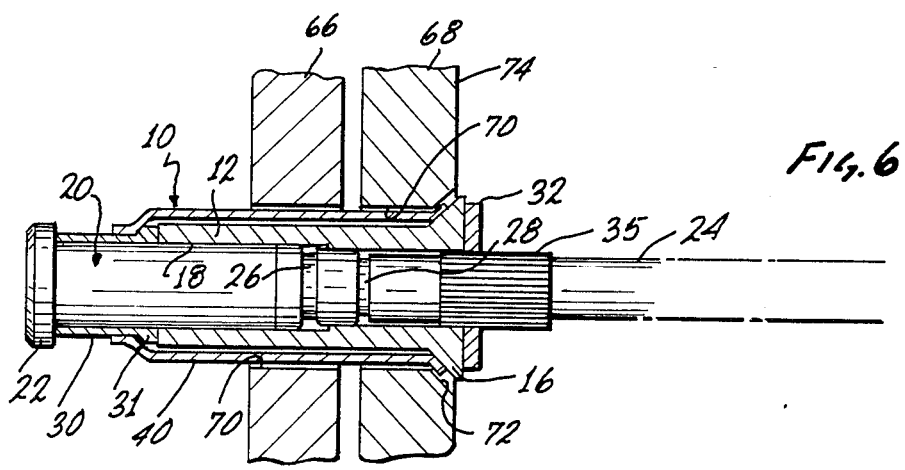
FIG. 6 shows a fluid-tight blind rivet according to this invention placed in a rivet hole formed in two overlapping sheets to be fastened together.

With reference to the drawings, FIG. 1 illustrates in axially exploded perspective a blind rivet fastener of the type used to make the fluid-tight rivet of the present invention. The rivet 10 comprises a tubular rivet shank or body 12 having an inner end 14 and a rivet head 16 at its opposite end. A pull-stem 20 extends axially through an inner bore 18 in the rivet body 12. The pullstem has a stem head 22 at its inner end, a grooved outer portion 24, a radial locking groove 26 and a radial break groove 28, the two grooves being axially spaced on an intermediate portion of the pull-stem. A cylindrical collapsible barrel 30 is mounted co-axially on the pull-stem and is captive between the stem head 22 and the inner end 14 of the rivet body 12. The collapsible barrel has a cylindrical outer surface of constant diameter except at the end of the barrel proximal to the inner end of the rivet body where a radial flange 31 is formed which increases the diameter of the barrel at that end. The radial flange has an outer diameter intermediate the outer diameter of the rivet body and that of the remainder of the barrel. A washer-like stop anvil 32 is placed near or against the outer face of the rivet head 16 and is retained in place by a friction fit with an axially grooved portion 35 of the pull-stem 20. As seen in FIGS. 2-5, the stop anvil 32 is seated on a portion 35 of the pull-stem 20 which is grooved in an axial direction and dimensioned to make a friction fit within the inner hole of the anvil 32, but allows the stem 20 to be pulled through the anvil as the rivet is set. In FIG. 2 the various parts of the rivet 10 are shown in normal assembled relationship, and the fastener 10 has been provided with an outer jacket or sleeve 40 fitted over and covering the rivet body 12. The sleeve 40 is generally tubular with a slightly flared forward end 42 and a crimped inner end 44. In the embodiment illustrated in FIG. 2 the outer sleeve 40 fully covers the shank 12 of the rivet as well as a portion of the collapsible barrel 30. The innermost portion of the jacket 40 is crimped to taper down in diameter over the flange 31 and fit against the reduced diameter of the barrel 30. Preferably, the crimped end makes a sufficiently tight fit about the barrel 30 to hold the sleeve 40 against axial sliding movement. Even if this is not the case, however, the inner end 44 of the sleeve 40 is stopped by the enlarged stem head 22 and the sleeve 40 is thus retained against separation from the rivet unit 10. It is presently preferred that the sleeve 40 be impact extruded tubing made of 1100 aluminum alloy of 0.004 inch thickness, The "1100" alloy, also known as "dead soft alloy" is a highly ductile material of nearly pure aluminum. A lesser thickness of aluminum, for example 0.002 inch may serve in most applications, although such thin metal is difficult to handle and thus the 0.004 inch thick sleeve is presently preferred.

In the alternative, instead of forming a separate sleeve element 40, the present invention also contemplates the direct application of an outer layer of relatively soft, ductile material such as aluminum onto the outer surface of the rivet body 12. A presently preferred manner of applying such a layer is by means of known and commercially practiced ion vapor deposition processes. By such methods it is currently possible to apply a 0.001 to 0.002 thick layer of aluminum onto the outer surface of the rivet shank 12. The vapor may be applied to the rivet body 12 after the rivet fastener 10 has been assembled, with portions of the rivet where no deposition is desired being masked to prevent such deposition.

FIG. 3 illustrates a fluid-tight blind rivet 10' which is similar to the rivet of FIG. 2 except that the rivet head 16' is a universal or rounded head, while the rivet of FIG. 2 is provided with a countersink head 16. Both types of head are well known. The rivet of FIG. 3 is provided with an aluminum outer sleeve 40 similar in configuration and rivet coverage to that of FIG. 2.

In FIG. 4, a flathead blind rivet similar to that of FIG. 2 has been provided with an under-head washer 50 which is generally frustoconical and fits against the similarly frusto-conical inner surface 34 of the countersink rivet head 16. Typically, the head washer 50 of FIG. 4 may be of similar material that of sleeve 40 of FIGS. 1 and 2 to but of somewhat greater thickness, e.g. between 0.007 to 0.010 inch thick.

FIG. 5 shows a still further embodiment of the present invention wherein a flathead blind rivet 10 with countersink head 16 has been provided with a full length outer sleeve 60 as well as a separate under-head washer 50 similar to the washer 50 of FIG. 4. The sleeve 60 of FIG. 5 has extended rearward coverage of the rivet fastener and fully covers the collapsible barrel 30, terminating adjacent to the stem head 22. The jacket 60 is crimped at 64 over the inner end 14 of the rivet shank 12 and flange 31 so as to taper down and closely conform to the outer surface of the collapsible barrel 30. The inner end 62 of sleeve 60 is by the larger diameter stem head 22 and is thus held against separation from the rivet unit. It will be understood that the full-length sleeve 60 or the shorter sleeve 40 of FIGS. 2 or 3 may be used together with or without an under-head washer 50.

An under-head washer is typically used where sheets of thin material are being riveted together such that the combined thickness of the sheets does not provide a sufficient bore surface in the rivet hole against which a tubular outer sleeve 40 or 60 could extrude to form an effective fluid-tight seal. In such cases, a head washer 50 may be preferred, which forms a fluid-tight seal between the conical inner head surface 34 and the conical seat 72 (shown in FIGS. 6-9) normally formed in the outer surface of the structure being fastened for receiving the countersink head.

The presently preferred material for both the outer sleeve 40 and the head washer 50 is aluminum, particularly in aircraft construction, although other relatively soft, ductile metals such as soft brass may be used in other applications. Non-metallic materials are generally disadvantageous due to their susceptibility to deterioration when exposed to ozone or ultraviolet radiation as in the case of rubber and certain plastics; their solubility in or susceptibility to chemical attack by aircraft fuels, hydraulic liquids, etc; and their low resistance to high temperatures, all of which are critical factors in aircraft construction.

FIGS. 6-9 illustrate the installation of a fluid-tight flathead blind rivet in a four stage sequence. The rivet being set is the one illustrated in and described in connection with FIG. 2. In the illustrated sequence, two overlapping sheets 66 and 68 are being fastened by means of the blind rivet 10. A rivet hole 70 is drilled through both sheets 66,68 and at one end of the rivet hole 70 is formed a conical seat 72 for accepting the countersink head 16 of the rivet so as to leave a substantially flush joint on the outer side 74 of the workpiece. The rivet may be set with the aid of a non-shifting single action blind rivet pulling head tool of conventional design (not shown in the drawings). The riveting tool receives the pull-stem 24 within a nose piece which is placed against the stop anvil 32. The tool grips the radially grooved outer portion 24 of the pull-stem 20 and applies pulling force thereto relative to the stop anvil 32, and consequently also relative to the rivet body 12 and workpiece sheets 66,68.

Figure 7:
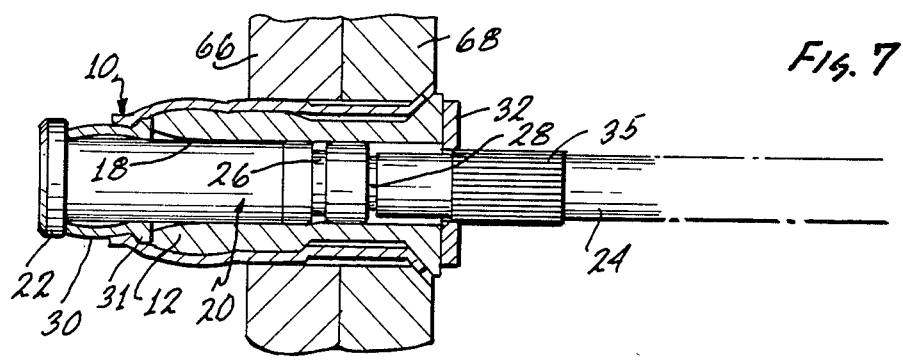
FIG. 7 shows the blind rivet of FIG. 6 in a first stage of rivet setting, illustrating initial expansion of the rivet body within the rivet hole.

A first stage in the rivet setting process is shown in FIG. 7. As the stem 20 is pulled the barrel 30 is driven against the inner end of the rivet body 12 by the stem head 22, and begins to collapse axially. The diameter of the barrel flange 31 adjacent the rivet shank is slightly undersized relative to the outer diameter of the rivet shank, as best seen in FIG. 6, such that the barrel tends to force its way into the inner bore 18 of the rivet body, causing the tubular rivet body 12 to spread and expand radially as the barrel advances thereinto. An initial stage of rivet body expansion is shown in FIG. 7, which expansion urges sheet 66 against sheet 68 while at the same time the expanding rivet body 12 begins to fill the inner end of the rivet hole 70. As the rivet shank 12 expands, the outer sleeve 40 expands together with the rivet shank and is urged thereby against the inner wall of the rivet hole 70, and the ductile sleeve material extrudes and flows to conform to such irregularities as may be present in the bore wall of the rivet hole 70.

Figure 8:
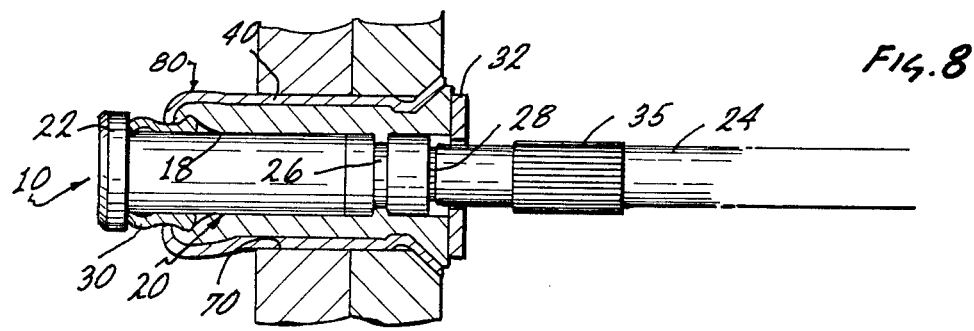
FIG. 8 illustrates a more advanced stage of the rivet setting process showing formation of the blind-side bulb and further rivet body expansion.

FIG. 8 illustrates a more advanced stage of the rivet setting process, showing appreciable formation of a blind-side bulb 80 with the rivet body 12 having expanded along most of its length within the rivet hole 70, the outer sleeve 40 expanding therewith. Material from the rivet body also expands and flows radially inwardly within the bore 18 to begin filling the locking groove 26, while the break-off groove 28 has reached nearly flush position with the flat outer face of the rivet head 16.

Figure 9:
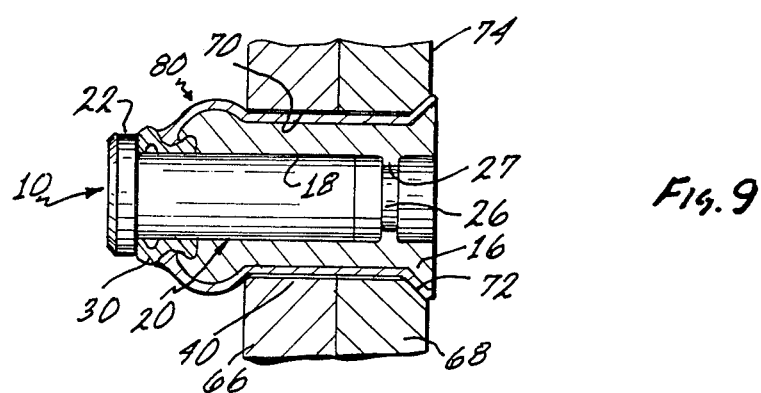
FIG. 9 shows the rivet of FIGS. 6-8 as finally installed after the pull-stem has been broken off flush with the countersunk rivet head.

As shown in the sequence of FIGS. 8 and 9, body rivet material is being gathered into the locking groove before the pull stem reaches its break-off position of FIG. 9 from the inner bore surface along a region of the bore 18 which lies intermediate the rivet head 16 and the opposite, inner end of the rivet body 12.

FIG. 9 shows the blind rivet fastener as finally installed with the pull-stem 24 broken off at the groove 28 flush with the outer face of the rivet head 16. The locking groove 26 has been fully filled by rivet shank material flowing thereinto and forming a radial flange 27. The flange 27 makes a positive mechanical interlock between the remaining inner portion of the pull-stem 20 and the rivet body 12, locking the pull-stem in place against residual tension in the fully collapsed barrel 30. The rivet body 12 has expanded fully along its entire length within the rivet hole 70, pressing the softer outer jacket 40 against the inner wall of the rivet hole 70. The ductile material of jacket 40 flows under pressure to completely fill the space between the outer surface of the rivet body 12 and the cylindrical inner wall of the rivet hole 70 thus making a fluid-tight seal between the rivet body and the sheets 66,68. The two sheets 66 and 68 are joined tightly between the rivet head 16 and the blind side bulb 80.

As seen in FIG. 6 the pull stem 24 includes an inner pull stem section 18 of larger diameter ending in a pull stem shoulder 29 immediately inwardly of the groove 26 and a pull stem section 19 of smaller diameter with a breakneck 28 thereon. These two pull stem sections are separated by the radial locking groove 26.

The rivet body 12 has a smooth walled bore section 19 of diameter smaller than the diameter of the pull stem shoulder 29 extending between from near the locking groove 26 to the rivet head 16. The pull stem shoulder 29 is initially disposed in the section 18 of larger diameter of the sleeve bore and when the rivet is pulled the shoulder 29 travels a substantial portion of the sleeve length through the sleeve bore section 19 of reduced diameter, as shown in FIGS. 7 and 8, to bring the breakneck 28 on the pull stem 24 into flush breaking alignment with the rivet head 16 as in FIG. 9, simultaneously expanding the sleeve O.D. and gathering sleeve material from the smooth bore wall 19 into the locking groove 26 thereby forming the radial flange 27 mechanically interlocking with the pull stem to prevent subsequent withdrawal of the stem from the expanded rivet body and also sealing the inner sleeve bore against fluid leakage.

The outer sleeves 40 or 60 of FIGS. 2 and 5 respectively increase the outer diameter of the rivet and it is therefore desirable to increase the diameter of the rivet hole by 0.008 inches over the normally recommended hole diameter for any given rivet size, if a 0.004 thick outer sleeve is used.

The blind rivet discovered by this applicant to be useful as a reliable and effective fluid-tight rivet when provided with a soft metal sleeve or ductile jacket is commercially available at present from the Huck Manufacturing Company, Aerospace Fastener Division, P.O. Box 5628, Carson, Calif., Telephone (213) 830-8200, as their Huck-Clinch TM series of blind rivets qualified under specification MIL-R-007885 and identified by Huck Part Numbers beginning with the designations OHCF (for flush head rivets) or OHCP (for protruding head rivets). These are fully metallic fasteners characterized by both superior rivet hole fill and positive rivet sleeve bore sealing, which qualities were found necessary by this applicant for successful performance as a fluid-tight rivet in combination with the soft metal-jacket or ductile sleeve. Good hole fill is instrumental in flowing the ductile jacket material against the workpiece sheet metal being joined and in thus forming a good seal not only at the blind end of the rivet hole but also within the rivet hole at the joint line between the overlapping sheets being fastened. A good internal seal in the rivet hole is essential for true fluid-tight performance since fluid leakage between the sheets of the workpiece must be taken into account and closed off in additon to fluid leakage straight-through the rivet hole between the sleeve and the sheet metal from the blind side to the exposed side of the work piece. A third leakage path which must also be closed off is leakage through the interior bore of the sleeve. Notwithstanding the repeated failure of other aerospace quality blind fasteners to function in a satisfactory manner when provided with a ductile sleeve, it has been found surprisingly that the Huck-Clinch series of aerospace blind fasteners do perform as fluid-tight blind rivets when provided with a ductile sleeve according to the teachings of the present disclosure.

The Huck-Clinch rivets as presently marketed are not claimed to be fluid-tight fasteners nor are promoted as having any properties which would make these fasteners adaptable for fluid-tight use. The characteristics of this particular series of rivets for successful combination with a ductile jacket were identified solely as a result of this applicant's effort and inventiveness.

The Huck-Clinch rivets provide a readily available core for the fluid-tight fastener of this invention, which core is an aerospace quality fastener recognized in the industry and designed to the requirements of MIL-R-007885. The Huck-Clinch series of rivets are a variant fastener qualified under the aforementioned MIL-R-007885, there being only one other aerospace rivet meeting this MIL specification, a blind fastener well known in the industry as the Cherrymax series of blind fasteners and manufactured by a third party. Although both the Cherrymax and Huck-Clinch fasteners meet the same MIL specification and are functionally equivalent insofar as the MIL spec requirements, the Cherrymax blind fasteners differ in construction and mode of operation from the Huck-Clinch blind rivets and have not been found suitable for use in combination with a ductile jacket as disclosed and claimed by this applicant.

While particular embodiments of the invention have been illustrated and described for purposes of clarity only, it will understood that still further modifications, changes and substitutions will become apparent to those possessed of ordinary skill in the art. Therefore, the invention is not limited to the particular embodiments illustrated but its scope is deformed only by the scope of the following claims.

What is claimed is:

1. A fluid-tight blind rivet comprising in combination:
   a blind rivet including a tubular rivet body having an inner end and a rivet head at its opposite end, a pull-stem extending through an inner bore in said rivet body, and an axially collapsible barrel on said pull-stem, said rivet body being expandable within a rivet hole bored in a workpiece responsive to pulling force applied to said pullstem relative to said rivet body so as to drive said barrel against said inner end;
   a radial locking groove on said pull stem within said inner bore such that rivet body material is gathered into said locking groove along a region of said inner bore intermediate said rivet head and said inner end as said stem is pulled through said bore thereby forming a radial flange mechanically interlocking with the pull stem to prevent subsequent withdrawal of the stem from the expanded rivet body and also sealing the inner bore against fluid leakage; and
   a relatively thin outer sleeve on said rivet body, said outer sleeve being of ductile material substantially softer than the material of said rivet body so as to extrude under pressure of said expanding rivet body and form a fluid-tight seal between said sleeve and the workpiece being fastened, said outer sleeve covering said rivet body from said head end to said inner end and further extending partially over said collapsible barrel;
   said collapsible barrel being cylindrical and of outer diameter smaller than said rivet body, said barrel lying between an enlarged stem head and said rivet body, said barrel further having a radial flange at its end adjacent the inner end of the rivet body, said radial flange having an outer diameter intermediate the outer diameters of the inner portion of said barrel and said rivet body, said outer sleeve being crimped so as to taper over said flange and terminate in an inner end having a diameter closely fitting about said barrel, the inner end of said sleeve being of smaller diameter than said stem head such that the sleeve is retained against separation from said stem.

2. In a blind rivet suitable for use in air frame construction of the type having:

a tubular rivet body having an inner end and a rivet head at its opposite end, a pull-stem extending through an inner bore in said rivet body, and an axially collapsible barrel on said pull-stem, said barrel being driven against said inner end responsive to application of pulling force to said pull-stem relative to said rivet body so as to expand the rivet body within a rivet hole in a workpiece being fastened; and a pull stem section of larger diameter ending in a pull stem shoulder and a pull stem section of smaller diameter with a breakneck thereon, said sections separated by a radial locking groove on said pull stem within said inner bore;

said rivet body having a smooth walled bore section of diameter smaller than the diameter of said pull stem shoulder between said locking groove and said rivet head, said trailing shoulder traveling a substantial portion of the sleeve length through said bore section of reduced diameter to bring said breakneck into flush breaking alignment with said rivet head simultaneously expanding the sleeve O.D. and gathering sleeve material from said smooth wall into said locking groove thereby forming a radial flange mechanically interlocking with the pull stem to prevent subsequent withdrawal of the stem from the expanded rivet body and also sealing the inner bore against fluid leakage;

the improvement comprising:

a relatively thin outer layer extending substantially from said rivet head to said inner end on said rivet body, said outer layer being of ductile material substantially softer than the material of said rivet body so as to extrude under pressure of said expanding rivet body and form a fluidtight seal between said sleeve and the workpiece being fastened, whereby said blind rivet is made fluid tight for use in wet-wing airframe structures and like.

3. The rivet of claim 2 wherein said layer is applied directly to said rivet body.

4. The rivet of claim 2 wherein said layer is an element fitted onto said rivet body but formed separately therefrom.

5. The rivet of claim 2 wherein said layer is a tubular outer sleeve element extending over said rivet body and at least a portion of said collapsible barrel.

6. The rivet of claim 2 wherein said rivet has a countersink head with a frustoconical inner surface and wherein said layer includes a tubular outer sleeve element extending over said rivet body and at least a portion of said collapsible barrel and a frustoconical head washer seated onto said inner head surface.

* * * * *